United States Patent
Cignarale et al.

(10) Patent No.: US 11,592,632 B2
(45) Date of Patent: Feb. 28, 2023

(54) ROUND AND SMALL DIAMETER OPTICAL CABLES WITH A RIBBON-LIKE OPTICAL FIBER STRUCTURE

(71) Applicants: AFL Telecommunications LLC, Duncan, SC (US); FUJIKURA LTD., Tokyo (JP)

(72) Inventors: Joseph Cignarale, Greer, SC (US); Doug Baker, Spartanburg, SC (US); Yoshio Hashimoto, Greer, SC (US); Ken Osato, Chiba (JP)

(73) Assignees: AFL Telecommunications LLC; FUJIKURA LTD.

( * ) Notice: Subject to any disclaimer, the term of this patent is extended or adjusted under 35 U.S.C. 154(b) by 19 days.

(21) Appl. No.: 17/232,843

(22) Filed: Apr. 16, 2021

(65) Prior Publication Data

US 2021/0239928 A1 Aug. 5, 2021

Related U.S. Application Data

(63) Continuation of application No. 16/688,387, filed on Nov. 19, 2019, now Pat. No. 11,231,556, which is a continuation of application No. 16/687,016, filed on Nov. 18, 2019, now Pat. No. 10,955,630, which is a continuation of application No. 16/032,791, filed on Jul. 11, 2018, now Pat. No. 10,527,807, which is a continuation of application No. 15/890,845, filed on Feb. 7, 2018, now Pat. No. 10,520,691, which is a continuation of application No. 15/349,399, filed on Nov. 11, 2016, now Pat. No. 9,958,627, which is a continuation of application No. 13/994,245, filed as application No. PCT/US2012/036076 on May 2, 2012, now abandoned.

(51) Int. Cl.
  *G02B 6/44* (2006.01)
(52) U.S. Cl.
  CPC .......... *G02B 6/4405* (2013.01); *G02B 6/441* (2013.01); *G02B 6/4403* (2013.01)
(58) Field of Classification Search
  CPC ..... G02B 6/4405; G02B 6/4403; G02B 6/441
  See application file for complete search history.

(56) References Cited

U.S. PATENT DOCUMENTS

| 4,666,244 A | 5/1987 | Van der Velde et al. |
| 5,268,971 A | 12/1993 | Nilsson |
| 5,495,546 A | 2/1996 | Bottoms, Jr |

(Continued)

FOREIGN PATENT DOCUMENTS

| CA | 2610858 C | † 12/2006 |
| DE | 60203152 T2 | † 5/2006 |

(Continued)

OTHER PUBLICATIONS

AFL TelecommunicationS LLC; AlumaCore OPGW Specification Sheet.

(Continued)

*Primary Examiner* — Ellen E Kim
(74) *Attorney, Agent, or Firm* — Dority & Manning, P.A.

(57) ABSTRACT

An optical fiber cable including an optical fiber ribbon in a pipe, wherein the ribbon includes at least two optical fibers arranged side by side, and wherein at least two of the optical fibers are bonded intermittently along a length of the fibers.

11 Claims, 8 Drawing Sheets

(56) References Cited

U.S. PATENT DOCUMENTS

| | | | |
|---|---|---|---|
| 5,857,051 A | 1/1999 | Ruben | |
| 5,966,489 A | 10/1999 | Harwell et al. | |
| 6,088,499 A | 7/2000 | Newton et al. | |
| 6,185,352 B1 | 2/2001 | Hurley | |
| 6,195,488 B1 | 2/2001 | Song | |
| 6,215,931 B1 | 4/2001 | Risch et al. | |
| 6,229,944 B1 | 5/2001 | Yokokawa et al. | |
| 6,259,844 B1 | 7/2001 | Logan | |
| 6,292,611 B1* | 9/2001 | Chamberlain | G02B 6/4411 385/112 |
| 6,459,837 B1 † | 10/2002 | Fitz | |
| 6,574,400 B1 | 6/2003 | Lail | |
| 6,584,257 B1 | 6/2003 | Hurley et al. | |
| 6,631,229 B1 † | 10/2003 | Norris | |
| 6,690,867 B2 | 2/2004 | Melton et al. | |
| 6,751,383 B2 † | 6/2004 | Um | |
| 6,876,798 B2 | 4/2005 | Triplett | |
| 6,895,156 B2 | 5/2005 | Walker, Jr. | |
| 7,006,740 B1 | 2/2006 | Parris | |
| 7,068,893 B2 | 6/2006 | Oh | |
| 7,206,481 B2 | 4/2007 | Quinn | |
| 7,471,862 B2 | 12/2008 | Bringuier | |
| 7,986,863 B2 | 7/2011 | Fruhnert | |
| 8,036,509 B2 | 10/2011 | Parros et al. | |
| 8,107,781 B2 | 1/2012 | Kachmar | |
| 8,412,014 B2 | 4/2013 | Sato | |
| 8,548,293 B2 | 10/2013 | Kachmar | |
| 8,548,294 B2 | 10/2013 | Toge | |
| 8,682,124 B2 | 3/2014 | Logan | |
| 8,909,014 B2 † | 12/2014 | Gimblet | |
| 8,989,543 B2 | 3/2015 | Homma | |
| 9,008,478 B2 | 4/2015 | Matsuzawa | |
| 9,031,371 B2 | 5/2015 | Yonezawa | |
| 9,073,243 B2 | 7/2015 | Gimblet | |
| 9,086,555 B2 | 7/2015 | Namazue et al. | |
| 9,256,043 B2 | 2/2016 | Haymore | |
| 9,594,226 B2 | 3/2017 | Blazer | |
| 10,007,078 B2 | 6/2018 | Sato | |
| 2003/0133676 A1 | 7/2003 | Kobayashi | |
| 2003/0215198 A1 | 11/2003 | Newton | |
| 2004/0240808 A1 | 12/2004 | Rhoney | |
| 2005/0201697 A1 | 9/2005 | Tanaka | |
| 2005/0226573 A1 | 10/2005 | Okuno | |
| 2007/0081774 A1 | 4/2007 | Suzuki | |
| 2008/0056653 A1 | 3/2008 | Sato | |
| 2008/0285924 A1 † | 11/2008 | Graveston | |
| 2009/0116797 A1 | 5/2009 | Stingl | |
| 2010/0067856 A1* | 3/2010 | Knoch | G02B 6/441 385/113 |
| 2010/0092140 A1* | 4/2010 | Overton | G02B 6/02395 385/112 |
| 2010/0296781 A1 | 11/2010 | Sato et al. | |
| 2011/0110635 A1 | 5/2011 | Toge et al. | |
| 2011/0194825 A1* | 8/2011 | Parris | G02B 6/4486 156/185 |
| 2011/0217012 A1 | 9/2011 | Bigot-Astrue et al. | |
| 2012/0281953 A1 | 11/2012 | Choi | |
| 2013/0156390 A1 | 6/2013 | Matsuzawa | |
| 2014/0314382 A1 | 10/2014 | Sato | |

FOREIGN PATENT DOCUMENTS

| | | |
|---|---|---|
| EP | 0540988 A1 | 5/1993 |
| EP | 1106826 A2 | 6/2001 |
| EP | 1302797 A2 † | 4/2003 |
| GB | 2262357 | 6/1993 |
| JP | 01157006 | 6/1989 |
| JP | H08327863 | 12/1996 |
| JP | H0922619 A | 1/1997 |
| JP | H09243885 A | 9/1997 |
| JP | H10503854 A | 4/1998 |
| JP | H11160593 A | 6/1999 |
| JP | 2000155245 | 6/2000 |
| JP | 2000221370 | 8/2000 |
| JP | 2001221163 | 8/2001 |
| JP | 2003215412 A | 7/2003 |
| JP | 2005062427 A | 3/2005 |
| JP | 2005070770 A | 3/2005 |
| JP | 2005300698 A | 10/2005 |
| JP | 2007-108424 A | 4/2007 |
| JP | 2007279226 A | 10/2007 |
| JP | 4143651 B2 | 9/2008 |
| JP | 2010008923 A | 1/2010 |
| JP | 2011100115 A | 5/2011 |
| JP | 2011221163 A | 11/2011 |
| KR | 20000033196 | 6/2000 |
| KR | 20100000036 A † | 1/2010 |
| WO | WO2009062131 A1 | 5/2009 |
| WO | WO2015050018 | 4/2015 |
| WO | WO2015132996 | 9/2015 |

OTHER PUBLICATIONS

AFL Telecommunications LLC; CentraCore OPGW Specification Sheet.

AFL Telecommunications LLC; HexaCore OPGW Specification Sheet.

AU Office Action Corresponding to Application No. 2020203524 dated Sep. 10, 2021.

\* cited by examiner
† cited by third party

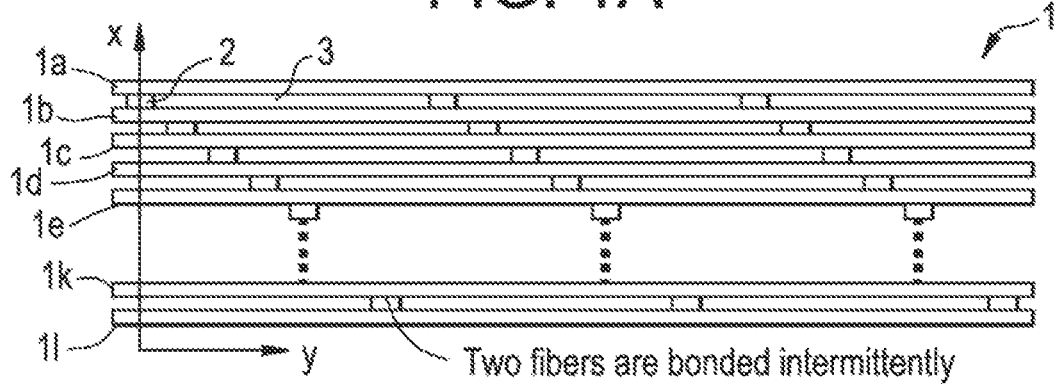
FIG. 1A
FIG. 1B    FIG. 1C
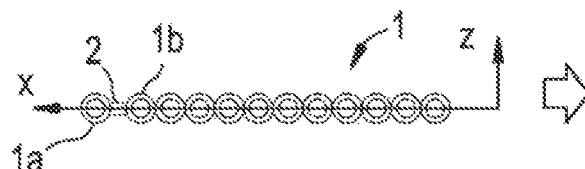 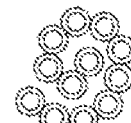
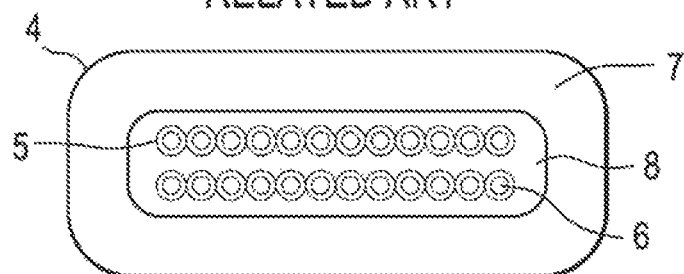
FIG. 2
RELATED ART
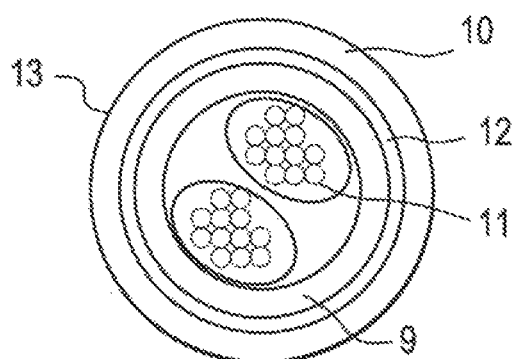
FIG. 3
RELATED ART

ROUND AND SMALL DIAMETER OPTICAL CABLES WITH A RIBBON-LIKE OPTICAL FIBER STRUCTURE This application is a continuation application of U.S. patent application Ser. No. 16/688,387, filed on Nov. 19, 2019, which is a continuation application of U.S. patent application Ser. No. 16/687,016, filed on Nov. 18, 2019, which is a continuation application of U.S. patent application Ser. No. 16/032,791, filed on Jul. 11, 2018, which is a continuation of U.S. patent application Ser. No. 15/890,845, filed Feb. 7, 2018, which is a continuation application of U.S. patent application Ser. No. 15/349,399, filed Nov. 11, 2016, which is a continuation application of U.S. patent application Ser. No. 13/994,245, filed Apr. 28, 2015, which is based upon and claims the benefit of priority as a U.S. national stage filing of International Application No. PCT/US2012/036076 having an international filing date of May 2, 2012, the disclosures of all of which are incorporated by reference herein in their entireties.

BACKGROUND

1. Field

The invention is related to an optical fiber cable that incorporates a ribbon-like structure in place of individual loose optical fibers.

2. Related Art

Two different types of optical fiber cables are ribbon cables and cables with individual optical fibers, either loose-tube, or tightly buffered. When designing and building networks, the advantages and disadvantages of these cables are weighed. Some of the advantages and disadvantages of these cables are listed below.

Advantages of ribbon cables include: (1) they allow for easy MPO connectorization; (2) they are relatively easy to mass splice; and (3) they provide for lower skew than cables with individual fibers. However, the design and manufacturing of ribbon cables can be more difficult.

Advantages of cables with individual fibers: (1) Lower PMD than ribbon cable; and (2) the design and manufacturing of the cables is easier relative to ribbon cables.

FIG. 2 shows an example of a conventional flat ribbon cable 4. This type of ribbon cable can be used by a user that requires low skew considering high speed transmission (e.g. 40 G or 100 G of parallel transmission). In addition, users that like the easy operation of MPO connectorization may use this type of cable. Two 12 fiber ribbons 5, 6 are stacked on top of each other in the cable 4. The cable 4 has an outer jacket 7. Aramid 8 is inside of the jacket and the inner shape is rectangular to keep the ribbon shape flat. This type of cable requires careful handling during the installation, because bending in incorrect directions may damage the fibers.

Conventional single-fibers cable are sometimes used by the users who prefer round and small cables. FIG. 3 shows an example of a single-fiber cable 13. Twenty-four fibers can be divided into two 12 fiber bundle units 11 by the binders. An appropriate amount of aramid yarn 12 is inserted between an inner pipe (e.g., a pipe 9) and an outer pipe 10 to protect the optical fibers from tension during installation and use. This type of cable allows a multiple installation into limited space because of its small diameter, light weight and flexibility.

It is an object of the invention to produce cable structure that has the advantages of both ribbon cables and single-fibers cables.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

A first embodiment of the invention is an optical fiber cable including an optical fiber ribbon in a pipe; wherein the ribbon includes at least two optical fibers arranged side by side; and wherein at least two of the optical fibers are bonded intermittently along a length of the fibers.

Other features of the first embodiment may include some of the following: the fibers being multi-mode fibers, the ribbon being twisted helically, the ribbon being S-Z twisted, the ribbon being tightly buffered, the ribbon being loosely buffered with a gel is in the pipe, the ribbon being loosely buffered with an aramid yarn in the pipe, the ribbon being loosely buffered with a water blocking yarn in the pipe, the outer diameter of the jacket pipe being equal to or less than 3.0 mm and the ribbon having twelve fibers, the outer diameter of the pipe beings equal or less than 3.8 mm the cable including a second optical fiber ribbon in the pipe wherein the two optical fiber ribbons each have twelve fibers, the diameter of the pipe being equal or less than 4.8 mm and the cable including second, third and fourth optical fiber ribbons in the pipe wherein the four optical fiber ribbons each have twelve fibers, the pipe including stainless steel, the pipe including PBT, the pipe including a PBT alloy, the pipe including PE, the pipe including FRPE, and the pipe including PVC.

A third embodiment of the invention is a cable including a strength member and an optical fiber cable including an optical fiber ribbon in a pipe, wherein the ribbon includes at least two optical fibers arranged side by side, and wherein at least two of the optical fibers are bonded intermittently along a length of said fibers.

Other features of the third embodiment may include some of the following: the optical fiber cable being surrounded by the strength member and an outer pipe and wherein the strength member comprises aramid yarn, a central member and at least two additional optical fiber cables wherein the central member is surrounded by the at least three fiber optical cables, an outer pipe, an inner pipe and an aramid yarn layer between the inner and outer pipe, an inner pipe and an armor layer between the inner pipe and the outer pipe, the strength member including wires that surround the fiber optical cables, an aramid yarn between the fiber optical cable and an outer pipe, an aluminum pipe surrounding the fiber optical cables and wire strength elements surrounding the aluminum pipe, an aluminum pipe surrounding the fiber optical cable and wire strength elements surrounding the aluminum pipe, the fiber optical cable and strength member being arranged in parallel and a pipe surrounding the fiber optical cable and strength member, the strength member including an FRP rod, the strength member including metallic wires, the strength member including a stainless steel pipe with optical fibers in the pipe.

A fourth embodiment of the invention is a cable including an optical fiber cable including an optical fiber ribbon in a stainless steel pipe, and an outer pipe, wherein the ribbon includes at least two optical fibers arranged side by side, and wherein at least two of the optical fibers are bonded intermittently along a length of said fibers.

Other features of the fourth embodiment may a second optical fiber ribbon in the stainless steel pipe.

BRIEF DESCRIPTION OF THE DRAWINGS

FIGS. 1A to 1C show an exemplary embodiment of a fiber ribbon.

FIG. 2 is cross-sectional view of a conventional ribbon cable.

FIG. 3 is a cross-sectional view of a conventional cable with individual fibers.

DETAILED DESCRIPTION

Figure 4:
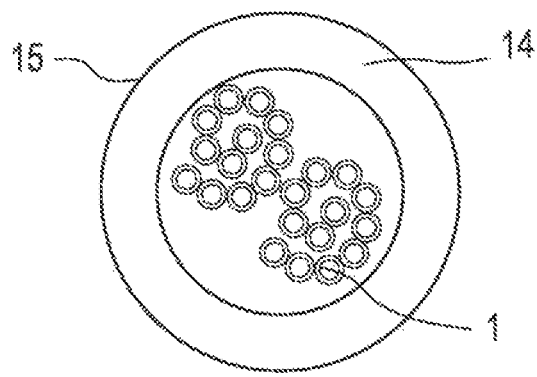
FIG. 4 shows an embodiment of a 24 fiber cable using the new fiber ribbon.

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, the exemplary embodiments will be described with reference to accompanying drawings.

The new concept ribbon shown in FIGS. 1A-1C allows for the design of round and small cables, like single-fibers cables. The new cable, using the new ribbons can satisfy requirement for premise cables, such as low skew, quick connectorization and multiple installations into limited spaces.

The features of the new cable design ribbon are described below using the example of 12 fiber ribbon 1 shown in FIGS. 1A-1C. FIG. 1A shows the 12 fiber ribbon 1 in a Z-direction view,. In FIG. 1A, twelve fibers $1a$ through $1l$ are arranged onto X-axis. The fibers can have an appropriate color arrangement, but that is not required. For example, a blue fiber $1a$ could be bonded intermittently with an orange fiber $1b$ which is next to blue one. In a similar way, all fibers $1a$-$1l$, which are arranged side by side, are bonded partially. Also, while this embodiment shows each fiber intermittently bonded to at least one other fiber, the intermittent bonding does not have to occur between each fiber. There may be some fibers that bonded to another fiber along the entire length of the fibers.

The fibers can be bonded by any know conventional methods. One such known method of bonding is described in U.S. Application Publication No. 2010/0296781, which is incorporated herein by reference. The bonding elements 2 are shown in FIGS. 1A and 1B. Note that only one bonding element 2 between fibers $1a$ and $1b$ is shown in FIG. 1B. There would also be bonding elements between the other fibers. There could also be bonding elements between the fibers in FIG. 1C.

FIG. 1A shows the bonding elements 2 arranged in a diagonal pattern across the ribbon. However, they do not have to be diagonal. Other patterns could also be used.

The length of the bonding element can be very small relative to the length of the fibers that are not attached to the bonding element (gap 3). For example, the length of the bonding element 2 could be between approximately 2 and 20 mm, with a preferable length of 10 mm. The gap between bonding elements could be between approximately 20 and 500 mm, with a preferable length of 50 mm. Preferable ratios of bonding length to gap length could be between approximately ⅕ to 1/20. This intermittent bonding structure enables the ribbon to be more flexible like single fibers.

FIG. 1B shows the y-direction view of the 12 fiber ribbon 1 that has not been inserted into a cable. FIG. 1C shows the y-direction view of the 12 fiber ribbon 1 that has been inserted into a cable (cable is not shown).

Alternatively, mass splicing could be performed in the same way as for a conventional ribbon.

Four fiber ribbon, eight fiber ribbon and other fiber arrangement can be used depending on she specific needs of the user. Also, multi-mode (MM) fibers and single mode (SM) fibers can be used depending on the specific needs of the user.

FIG. 4 shows an example of a 24 fiber cable 15 using the new fiber ribbon. The structure consists of two 12 fiber ribbons 1 and a pipe 14. In this embodiment, the pipe could be a single layer jacket. However, in the context of this invention, a pipe could refer to a "jacket" or a "tube." In this embodiment, the cable does not include aramid yarn inside the pipe 14. Each ribbon can be identified by marking on the ribbon or by using a different color of thread wound around the ribbon. In this embodiment, the pipe 14 material is PVC. Other pipe materials such as PE, FRPE, PP, PBT or other thermoplastics could also be used. The cable shape is round and the cable diameter is small, like conventional single-fiber cables. This cable may also be used as a unit in a larger cable. The ribbon type in the cable is variable. For example, the size of the ribbons may vary, for example, from 2 fibers to 24 fibers and the total fiber counts in the cable may also vary. The ribbon 1 can be twisted helically, or S-Z twisted.

Also, the inner diameter of the pipe could be adjusted so that the cable is considered to be either "tightly buffered," or "loosely buffered." One example of a tightly buffered cable would be one in which the ratio of the cross sectional area of the inner diameter of the pipe to the cross-sectional area of the ribbon would be less than approximately 1.34. Cables that are not "tightly buffered" may be considered to be "loosely buffered."

Figure 5:
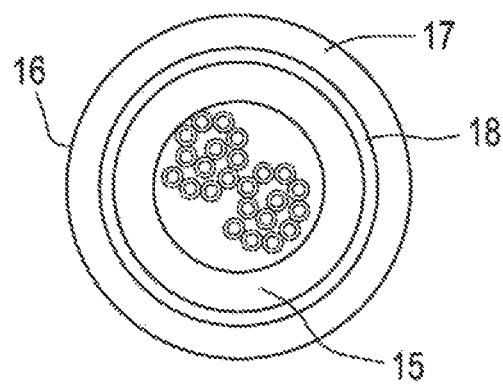
FIG. 5 shows an embodiment of a 24 fiber trunk cable 16 using the new fiber ribbon.

FIG. 5 shows an example of a 24 fiber trunk cable 16. Aramid yarns 18 are embedded between the 24 fiber cable 15 shown in FIG. 4 and an outer pipe 17. The amount of aramid yarns 18 will depend on the tensile performance requirements (e.g. GR409 vertical or GR409 horizontal). In this example, outer pipe material 17 is PVC. Other pipe materials such as PE, FRPE, Polyurethane, Polyamide or other thermoplastics could also be used. The cable shape is round and the cable diameter is small as in the conventional cable shown in FIG. 3. The ribbon type in the cable is variable. For example, the size of the ribbons may vary, for example, from 2 fibers to 24 fibers and the total fiber counts in the cable may also vary.

Figure 6:
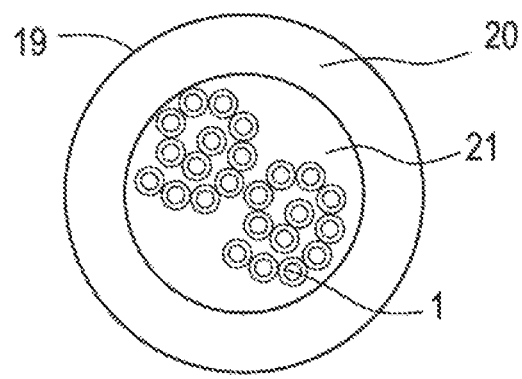
FIG. 6 shows an embodiment of a 24 fiber cable 19 for interconnect use using the new fiber ribbon.

FIG. 6 shows an example of a 24 fiber cable 19 for interconnect use. This cable consists of two 12 fiber ribbons 1 and Aramid yarns 21 surrounded by a single layer pipe 20. An appropriate amount of yarn 21 is embedded in order to meet tensile specification (e.g. GR409 interconnect). The pipe 20 material could be PVC PE, FRPE, Polyurethane, Polyamide or other thermoplastics. The cable shape is round and one example of the cable diameter is equal or less than 3.8 mm, which is same as that of the conventional single-fibers cable. However, other diameters may be used. The ribbon type in the cable is variable. For example, the size of the ribbons may vary, for example, from 2 fibers to 24 fibers and the total fiber counts in the cable may also vary. For example, if one 12 fiber ribbons is in the cable the cable diameter could be equal or less than 3.0 mm. Also, if four 12 fiber ribbons are in the cable the cable diameter could be equal or less than 4.8 mm.

Figure 7:
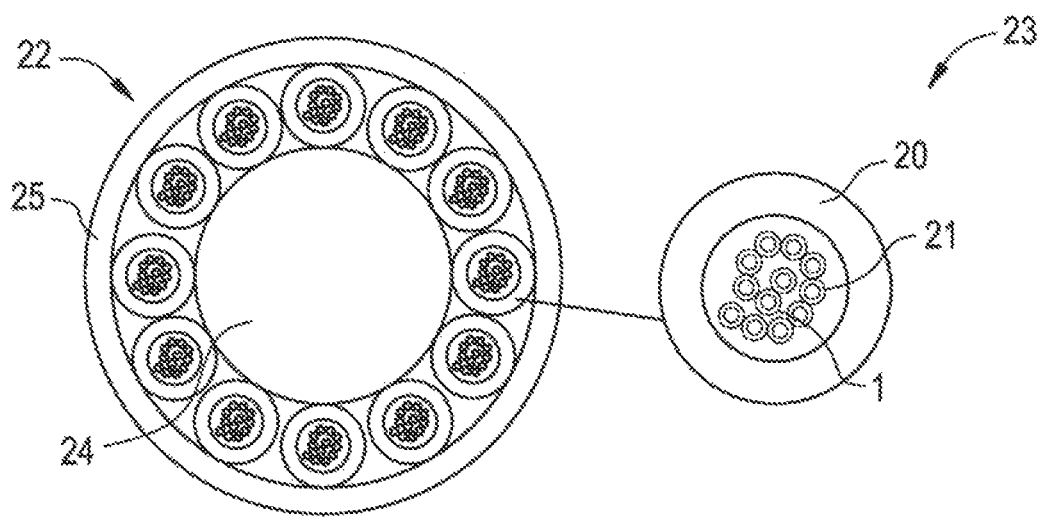
FIG. 7 shows an embodiment of a 144 fiber trunk cable for vertical and horizontal use using the new fiber ribbon.

FIG. 7 shows an example of a 144 fiber trunk cable for vertical and horizontal use. Twelve 12 fiber cables 23 with 3.0 mm outer diameters surrounded a central strength member 24. The cable 23 is similar to the cable 19 in FIG. 6, except that it has different fiber counts and outer diameter. An appropriate size of FRP is chosen as the central member 24 in order to meet tensile and temperature specifications (e.g. GR409 vertical or GR409 horizontal). The outer pipe material 25 can be PVC PE, FRPE, Polyurethane, Polyamide or other thermoplastics. Although the cable 22 shows that there are twelve 12 fiber cables 23, some of the cables 23 can be replaced with fillers which are made of PVC PE, FRPE, Polyurethane, Polyamide or other thermoplastics.

Figure 8:
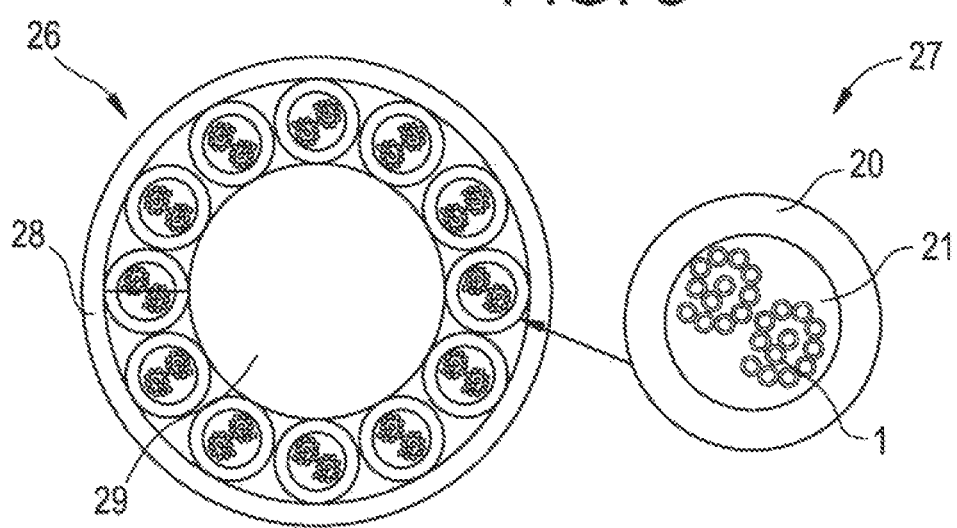
FIG. 8 shows an embodiment of a 288 fiber trunk cable 26 for vertical and horizontal use using the new fiber ribbon.

FIG. 8 shows an example of a 288 fiber trunk cable 26 for vertical and horizontal use. Twelve 24 fiber cables 27, with 3.8 mm outer diameters surrounded a central strength member 29. The cable 27 is same as cable 19 in FIG. 6. An appropriate size of FRP is chosen as the central member 29 in order to meet tensile specification (e.g. GR409 vertical or GR409 horizontal). The outer pipe material 28 can be PVC PE, FRPE, Polyurethane, Polyamide or other thermoplastics. Although the cable 26 shows that there are twelve 24 fiber cables 27, some of the cables 27 can be replaced with fillers which are made of PVC PE, FRPE, Polyurethane, Polyamide or other thermoplastics.

Figure 9:
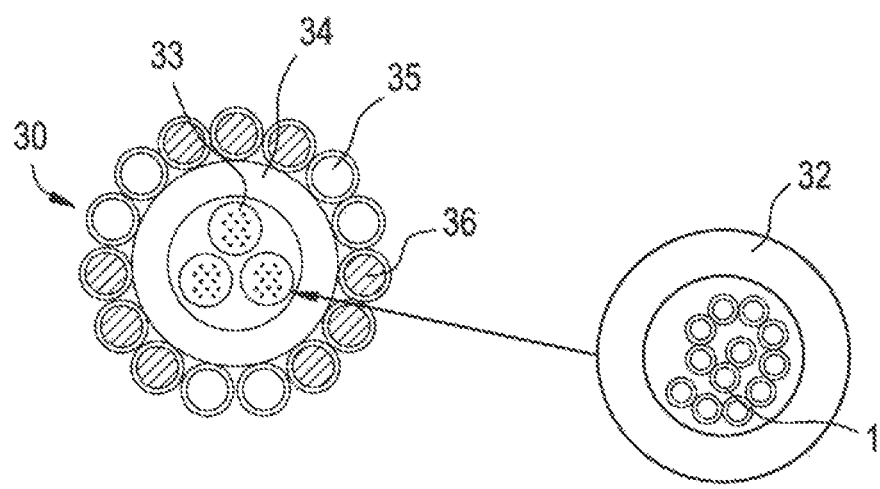
FIG. 9 shows an embodiment of an Alma core type OPGW cable using the new fiber ribbon.

The invention can also be used in optical ground wire (OPGW) cable. It enables mass splicing, which dramatically reduce the operation time of termination at difficult locations, such as pylons. FIG. 9 shows an example of a conventional Alma core type OPGW cable 30. It has three optical units 33 surrounded by an pipe 34. In this embodiment, the pipe 34 is made of aluminum. The pipe 34 is surrounded by several aluminum alloy wires 35 and several aluminum clad steel wires 36. The present invention can be incorporated into this OPGW application by replacing the optical units 33 with buffer pipes 32 containing a 12 fiber ribbon 1. The ribbon type is variable. For example, the size of the ribbons may vary, for example, from 2 fibers to 24 fibers. The buffer pipe 32 can be made of PE, PP, PBT, alloy of PBT, or other thermoplastics. The 12 fiber ribbon 1 can be tightly buffered by the pipe or loosely buffered by gel, silicon or air.

Figure 10:
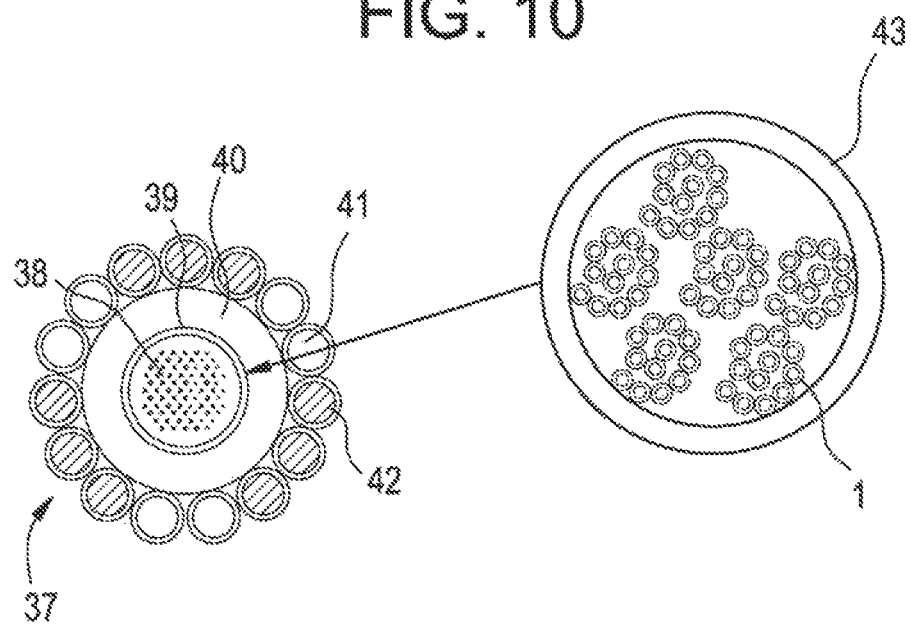
FIG. 10 shows an embodiment of a Centra core type OPGW cable using the new fiber ribbon.

FIG. 10 shows an example of a conventional Centra core type OPGW cable 37. The cable core consists of a hermetically sealed stainless steel pipe 39 with a plurality of optical fibers 38. The stainless steel pipe 39 is covered by an aluminum pipe 40 and the pipe 40 is surrounded by several aluminum alloy wires 41 and several aluminum clad steel wires 42. The present invention can be incorporated into this OPGW application by replacing the cable core with a stainless steel tube 43 containing one or more 12 fiber ribbons 1. The ribbon type is variable. For example, the size of the ribbons may vary, for example, from 2 fibers to 24 fibers. Gel, silicon or air can be filled into she stainless steel pipe 43.

Figure 11:
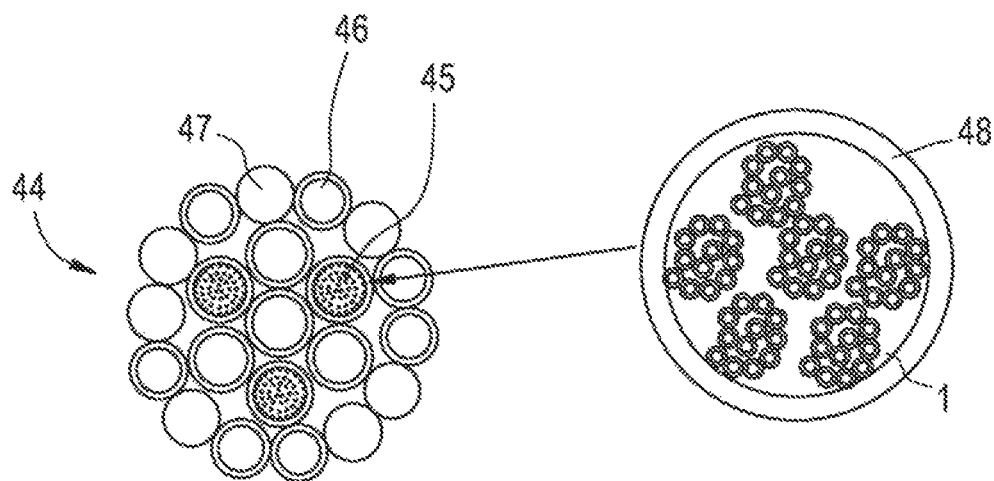
FIG. 11 shows an embodiment of a Hexa core type OPGW cable using the new fiber ribbon.

FIG. 11 shows an example of conventional Hexa core type OPGW cable 44. The core consists of three hermetically sealed stainless steel pipes 45, which include a plurality of fibers, and three aluminum clad steel wires 46 surrounding an aluminum clad steel wire 46. The core can be surrounded by an aluminum pipe (note shown) and then aluminum clad steel wires 46 and aluminum alloy wires 47. The present invention can be incorporated into this OPGW application by replacing the hermetically sealed stainless steel pipes 45 with a stainless steel pipe 48 containing one or more 12 fiber ribbons 1. The ribbon type is variable. For example, the size of the ribbons may vary, for example, from 2 fibers to 24 fibers. As a result, up to 432 fibers can be in one cable.

Loose tube cables, sometimes called black jacket cables, with single fibers are often used as a feeder cable, a distribution cable and a drop cable. Generally, a cable with relatively higher fiber counts is used as a feeder cable. Ribbon splicing between a feeder cable and another cable (which is a feeder cable or a distribution cable) would improve efficiency and reduce cable installation time and installation cost. However, low PMD for WDM is usually required for feeder cable. A feeder cable with the ribbons of this invention can satisfy both of these requirements (Ribbon splicing and low PMD).

A distribution cable is usually laid between a feeder cable and some drop cables. It is terminated with feeder cable at one of the cable end. For the termination at this access point, ribbon splicing is efficient. Also, it is terminated with another cable (which is a feeder cable or a drop cables) at another side of cable end or at the mid pint of the cable. For the termination at this access point, single-fiber splicing can be required. A distribution cable that uses the ribbon of this invention can make both ribbon splicing and single-fiber splicing easier.

Figure 12:
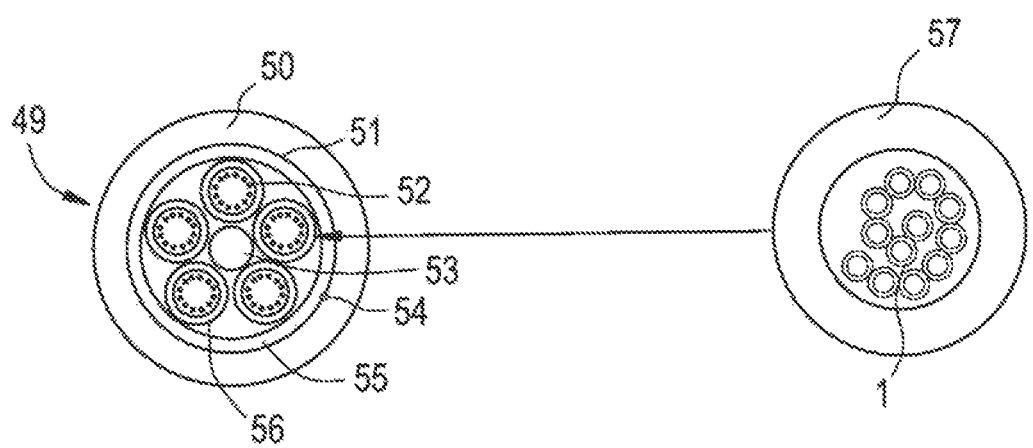
FIG. 12 shows an embodiment of a loose tube cable using the new fiber ribbon.

FIG. 12 shows an example of a conventional loose tube cable 49. The cable core consists of five gel-filled buffer pipes 56. The buffer pipes 56 are S-Z twisted around a central strength member 53, such as FRP. The buffer pipes 56 are surrounded by a water blocking system 55 and a polyester tape 51. There may also be a rip cord 54. Above the tape is a polyethylene pipe 50. The pipe material can be PVC, PE, FRPE, Polyurethane, Polyamide or other thermoplastics. The present invention can be incorporated into this loose tube application by replacing the buffer pipes 56 with a buffer pipe 57 containing one or more 12 fiber ribbons 1. The ribbon type is variable. For example, the size of the ribbons may vary, for example, from 2 fibers to 24 fibers.

The buffer pipe 57 can be PE, PP, PBT, alloy of PBT and Polyether, or other thermoplastics. The buffer pipe can filled with gel, silicon, yarn or air.

Figure 13:
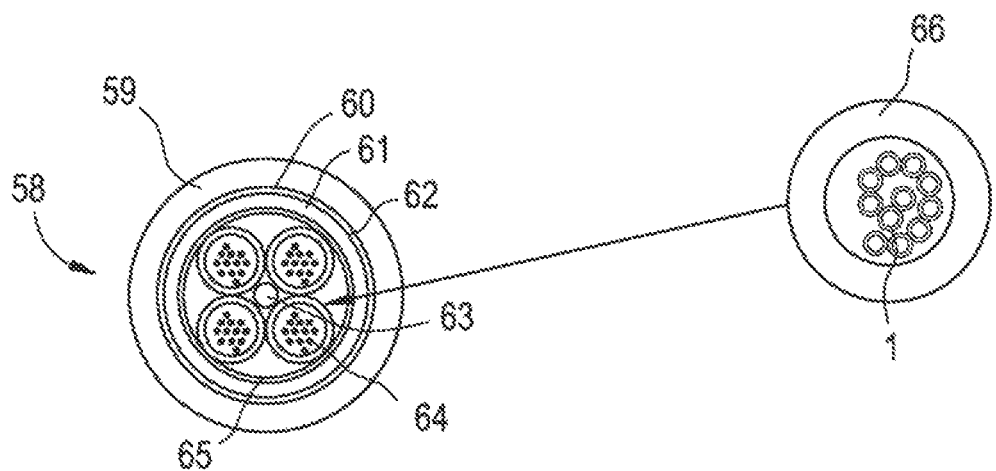
FIG. 13 shows an embodiment of an ADSS cable using the new fiber ribbon.

FIG. 13 shows an example of a conventional ADSS cable 58 for use in short spans. The cable core consists of four buffer pipes 64. The tubes are S-Z twisted around a central strength member 63, such as FRP. The buffer pipes 64 are surrounded by a water blocking system 65, such as water blocking yarn binder. Surrounding the water blocking system is torque balance aramid yarns 61. The aramid yarns 61 help protect the cable from the high tension needed for aerial installation. There may also be a rip cord 62. A polyester tape 60 surrounds the aramid yarns 61. Above the tape 60 is a polyethylene outer pipe 59. The pipe material can be PVC, PE, FRPE, Polyurethane, Polyamide or other thermoplastics. The present invention can be incorporated into this ADSS application by replacing the buffer pipes 64 with a buffer pipe 66 containing one or more 12 fiber ribbons 1. The ribbon type is variable. For example, the size of the ribbons may vary, for example, from 2 fibers to 24 fibers. The buffer pipe 66 can be PE, PP, PBT, alloy of PBT and Polyether, or other thermoplastics. The buffer pipe can filled with gel, silicon, yarn or air.

Figure 14:
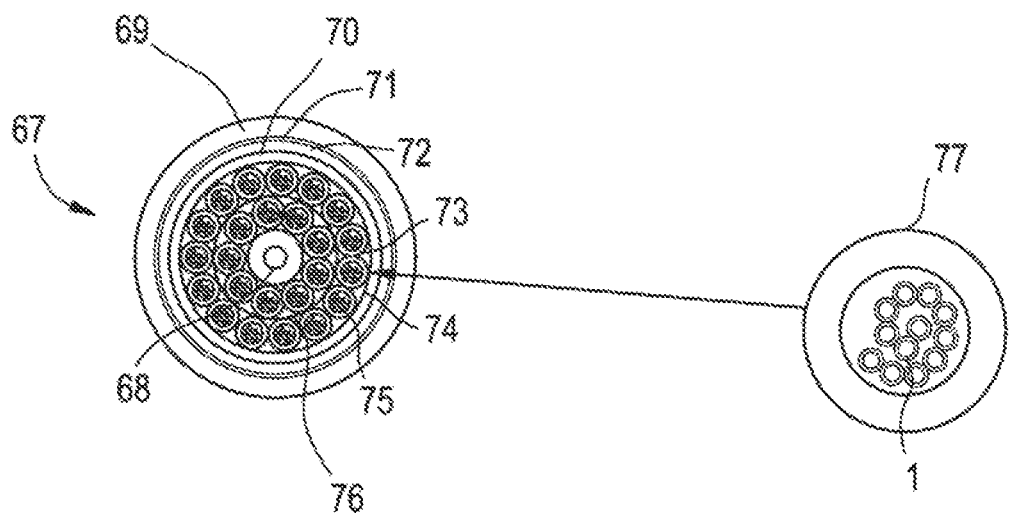
FIG. 14 shows an embodiment of an ADSS cable using the new fiber ribbon.

FIG. 14 shows an example of a conventional ADSS cable 67 for use in long spans. The cable core consists of 24 buffer pipes 75. Nine of the pipes 75 are arranged over a central strength member 68, such as FRP, to form a first layer and fifteen of the pipes 75 are arranged over the first layer to form a second layer. A water blocking binder 76 is in between the first and second layers. Surrounding the second layer is a non-hygroscopic core wrap 73 and then a polyethylene inner pipe 70. Surrounding the inner pipe 70 is torque balance aramid yarns 72. The aramid yarns 72 provide supporting during the aerial installation. There may also be a ripcord 74. Surrounding the aramid yarns 72 is a non-hygroscopic core wrap 71 and then a polyethylene or track resistant outer pipe 69. The inner and/or outer pipe material can be PVC, PE, FRPE, Polyurethane, Polyamide or other thermoplastics. The present invention can be incorporated into this ADSS application by replacing the buffer pipes 75 with a buffer pipe 77 containing one or more 12 fiber ribbons 1. The ribbon type is variable. For example, the size of the ribbons may vary, for example, from 2 fibers to 24 fibers. The buffer pipe 77 can be PE, PP, PBT, alloy of PBT and Polyether, or other thermoplastics. The buffer pipe can filled with gel, silicon, yarn or air. In addition, while this embodiment shows two pipe layers, there may only be one pipe layer.

Figure 15:
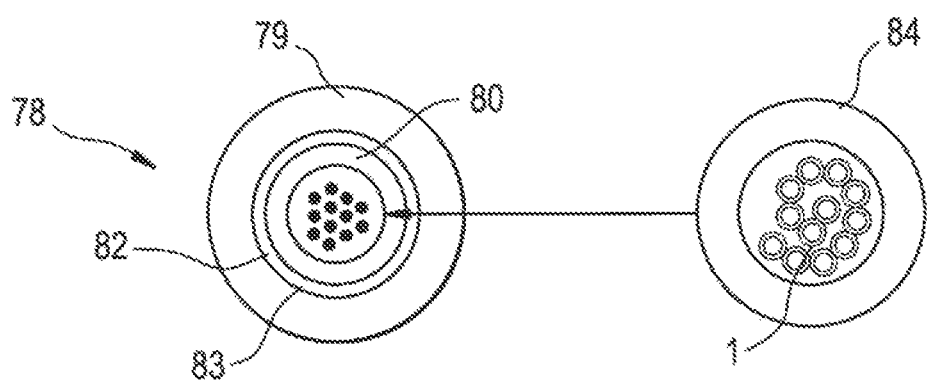
FIG. 15 shows an embodiment of a center loose tube cable using the new fiber ribbon.

FIG. 15 shows an example of a conventional center loose tube cable 78. The cable core consists of one buffer pipe 80 arranged at the center of the cable. Surrounding the core is a strength element 82, such as aramid yarn. A water blocking system 83 surrounds the strength member 82. Surrounding the water-blocking system 83 is a polyethylene outer pipe 79. The pipe material can be PVC, PE, FRPE, Polyurethane, Polyamide or other thermoplastics. The present invention can be incorporated into this center loose tube application by replacing the buffer pipe 80 with a buffer pipe 84 containing one or more 12 fiber ribbons 1. The ribbon type is variable. For example, the size of the ribbons may vary, for example, from 2 fibers to 24 fibers. The buffer pipe 84 can be ferrous or non-ferrous metal, PE, PP, PBT, alloy of PBT and Polyether, or other thermoplastics. The buffer pipe can filled with gel, silicon, yarn or air.

Figure 16:
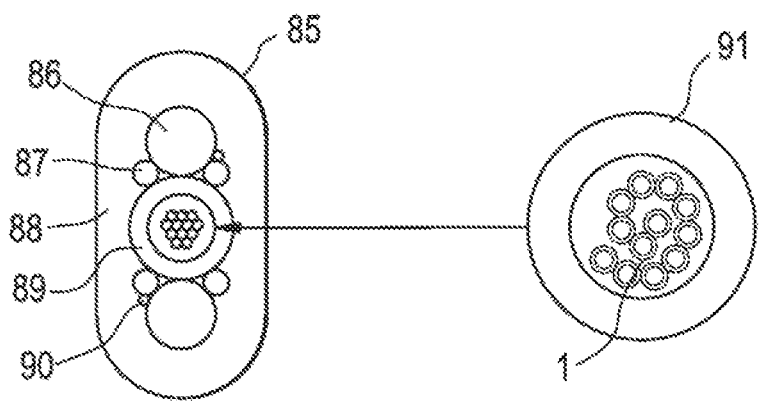
FIG. 16 shows an embodiment of a center loose tube cable using the new fiber ribbon.

FIG. 16 shows an example of another conventional center loose tube cable 85. Two strength members 86 are arranged on opposite sides of a buffer pipe 89 arranged at the center of the cable. The strength member can be any kind of ferrous or non-ferrous metal, any kind of FRP or metallic pipe with optical fibers. A water blocking system 87 is next to the strength members 86 and buffer pipe 89. An outer pipe 88 surrounds the interior elements. The pipe material can be PVC, PE, FRPE, Polyurethane, Polyamide or other thermoplastics. There may also be a ripcord 90. The present invention can be incorporated into this center loose tube application by replacing the buffer pipe 89 with a buffer pipe 91 containing one or more 12 fiber ribbons 1. The ribbon type is variable. For example, the size of the ribbons may vary, for example, from 2 fibers to 24 fibers. The buffer pipe 91 can be ferrous or non-ferrous metal, PE, PP, PBT, alloy of PBT and Polyether, or other thermoplastics. The buffer pipe can filled with gel, silicon, yarn or air.

Figure 17:
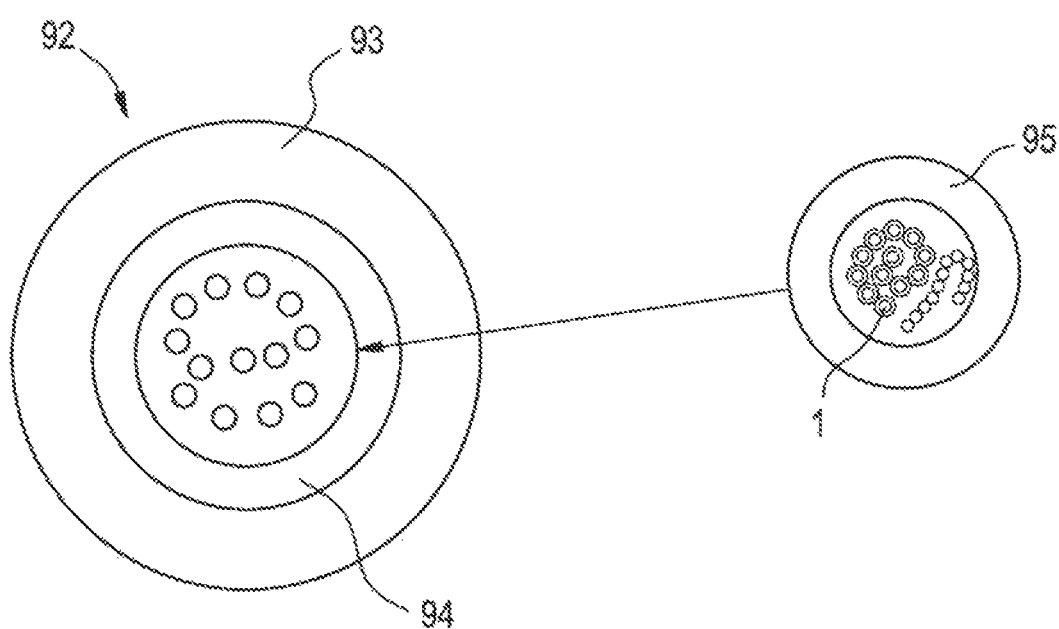
FIG. 17 shows an embodiment of a logging cable using the new fiber ribbon.

FIG. 17 shows an example of a conventional logging cable 92. The cable core consists of one stainless steel pipe 94 arranged at the center of the cable. Surrounding the stainless steel pipe 94 is a polyethylene outer pipe 93. The pipe material can be PVC, PE, FRPE, Polyurethane, Polyamide or other thermoplastics. The present invention can be incorporated into this center loose tube application by replacing the stainless steel pipe 94 with a buffer pipe 95 containing one or more 12 fiber ribbons 1. The ribbon type is variable. For example, the size of the ribbons may vary, for example, from 2 fibers to 24 fibers. The buffer pipe 95 can be ferrous or non-ferrous metal, PE, PP, PBT, alloy of PBT and Polyether, or other thermoplastics. The buffer pipe can filled with gel, silicon, yarn or air.

As mentioned above, although the exemplary embodiments described above are various types of cables, they are merely exemplary and the general inventive concept should not be limited thereto, and it could also apply to the stranding of other cables.

What is claimed:
1. A loose tube cable, comprising:
a central strength member;
a plurality of thermoplastic buffer pipes surrounding the central strength member;
a plurality of optical fiber ribbons, each of the plurality of optical fiber ribbons disposed within one of the plurality of buffer pipes, each of the plurality of optical fiber ribbons comprising a plurality of optical fibers and a plurality of bonding elements, each of the plurality of bonding elements bonding neighboring optical fibers of one of the plurality of optical fiber ribbons together such that the optical fibers are bonded intermittently along a length of the optical fibers in each of the plurality of optical fiber ribbons, wherein at least two of the plurality of optical fiber ribbons are disposed in at least one of the plurality of buffer pipes;
a water blocking system surrounding the plurality of buffer pipes; and
an outer thermoplastic pipe surrounding the water blocking system.

2. The loose tube cable of claim 1, wherein the central strength member is formed from a fiber reinforced polymer material.

3. The loose tube cable of claim 1, wherein the outer thermoplastic pipe is formed from polyethylene.

4. The loose tube cable of claim 1, wherein the at least two optical fiber ribbons are not twisted together.

5. The loose tube cable of claim 1, wherein the water blocking system is a water blocking yarn binder.

6. The loose tube cable of claim 1, further comprising a rip cord.

7. The loose tube cable of claim 1, wherein the bonding elements are arranged in a diagonal pattern across each of the plurality of optical fiber ribbons.

8. The loose tube cable of claim 1, wherein a length of each bonding element is less than a length of each non-bonded portion of the optical fibers.

9. The loose tube cable of claim 1, wherein a length of each bonding element is between approximately 2 millimeters and 20 millimeters.

10. The loose tube cable of claim 1, wherein a length of each non-bonded portion of the optical fibers is between 20 millimeters and 500 millimeters.

11. The loose tube cable of claim 1, wherein a ratio of the length of each bonding element to a length of each non-bonded portion of the optical fibers is between $1/5$ and $1/20$.

* * * * *